US008230009B1

(12) United States Patent
Wong et al.

(10) Patent No.: US 8,230,009 B1
(45) Date of Patent: Jul. 24, 2012

(54) TRANSMISSION OF INPUT VALUES USING AN UNRELIABLE COMMUNICATION LINK

(75) Inventors: Albert Wong, Seattle, WA (US); Hin Chung Lam, Seattle, WA (US); Sergey Ulanov, Bellevue, WA (US); Gary Kacmarcik, Bothell, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/246,200

(22) Filed: Sep. 27, 2011

Related U.S. Application Data

(63) Continuation of application No. 13/212,655, filed on Aug. 18, 2011.

(51) Int. Cl.
*G06F 15/16* (2006.01)

(52) U.S. Cl. .......................... 709/203; 709/231

(58) Field of Classification Search .......... 709/201–203, 709/217–234
See application file for complete search history.

(56) References Cited

U.S. PATENT DOCUMENTS

| 6,751,746 | B1 | 6/2004 | Jain et al. |
| 7,406,082 | B2 | 7/2008 | Nagarajan et al. |
| 7,533,349 | B2 * | 5/2009 | Saul et al. ............... 715/769 |
| 2004/0047367 | A1 * | 3/2004 | Mammen ............... 370/472 |
| 2005/0288917 | A1 * | 12/2005 | Hooper et al. ........... 703/21 |
| 2006/0285500 | A1 | 12/2006 | Booth et al. |
| 2008/0005792 | A1 * | 1/2008 | Larson et al. ........... 726/15 |
| 2008/0225804 | A1 * | 9/2008 | Thubert et al. ........... 370/338 |
| 2009/0237728 | A1 * | 9/2009 | Yamamoto ............... 358/1.15 |
| 2009/0323527 | A1 | 12/2009 | Accapadi et al. |
| 2010/0149966 | A1 * | 6/2010 | Achlioptas et al. ...... 370/217 |
| 2010/0169535 | A1 * | 7/2010 | Saxby et al. ............. 710/316 |

* cited by examiner

*Primary Examiner* — Yasin Barqadle
(74) *Attorney, Agent, or Firm* — Brake Hughes Bellermann LLP

(57) ABSTRACT

In one general aspect, a computer-readable storage medium can store instructions that when executed cause a client device to perform a process. The instructions comprising instructions to define a plurality of event packets where each event packet from the plurality of event packets includes an input value from a user interface device associated with the client device, and instructions to define, at a first time, a first carrier packet including the plurality of event packets. The instructions can also include instructions to define an additional event packet representing an additional input value from the user interface device associated with the client device, and define, at a second time, a second carrier packet including the additional event packet and at least a portion of the plurality of event packets.

26 Claims, 6 Drawing Sheets

TRANSMISSION OF INPUT VALUES USING AN UNRELIABLE COMMUNICATION LINK

CROSS-REFERENCE TO RELATED APPLICATION

This application is a continuation of U.S. Non-Provisional patent application Ser. No. 13/212,655, filed Aug. 18, 2011, entitled, "TRANSMISSION OF INPUT VALUES USING AN UNRELIABLE COMMUNICATION LINK," which is incorporated by reference herein in its entirety.

TECHNICAL FIELD

This description relates to processing of packets sent over a communication link.

BACKGROUND

A client device can be used to interact with an application operating at a host device during a remote desktop session via a communication link (e.g., a wireless connection, a remote connection). The host device can be configured to define a stream of screen images (e.g., screen updates) representing the interactions of the client device with the application, and can send the stream of screen images to the client device as the interactions are occurring during the remote desktop session. The interactions, which can be triggered by a user, can be represented by input values (e.g., binary input values) from a user interface device (e.g., a keyboard device, a mouse device) of the client device. The input values can be sent in discrete packets from the client device to the host device as the interactions with the application are triggered by a user.

When input values of the interactions sent over a communication link from the client device to the host device are delayed, processing of the input values to produce screen updates at the host, and sending of the screen updates from the host device to the client device will also be delayed. This round-trip latency (or delay) between the client device and the host device can result in a slow and undesirable user experience during a remote desktop session. The round-trip latency can be further exacerbated by reliable communication protocols that require, for example, delivery confirmation for each input value sent from the client device to the host device. Delivery confirmation can be implemented to ensure that input values are not lost—the loss of input values can also cause an undesirable user experience when inputs triggered by the user at the client device are not properly received by the host device. Thus, a need exists for systems, methods, and apparatus to address the shortfalls of present technology and to provide other new and innovative features.

SUMMARY

In one general aspect, a computer-readable storage medium can store instructions that when executed cause a client device to perform a process. The instructions comprising instructions to define a plurality of event packets where each event packet from the plurality of event packets includes an input value from a user interface device associated with the client device, and instructions to define, at a first time, a first carrier packet including the plurality of event packets. The instructions can also include instructions to define an additional event packet representing an additional input value from the user interface device associated with the client device, and define, at a second time, a second carrier packet including the additional event packet and a at least a portion of the plurality of event packets.

In another general aspect, an apparatus can include a packet parser configured to receive a first carrier packet including a first set of event packets where each event packet from the first set of event packets included an input value from a user interface device. The event packet parser can be configured to receive a second carrier packet including a second set of event packets duplicating at least a portion of the first set of event packets included in the first carrier packet. The apparatus can also include an event packet parser configured to identify an event packet different from each event packet included in the first set of event packets and the second set of event packets, and can be configured to register an input value included in the event packet in response to the identification.

In yet another general aspect, a method can include defining at a client device a stream of event packets where each event packet from the stream of event packets includes an input value from a user interface device associated with a client device. The method can also include defining a plurality of carrier packets including a portion of event packets from the stream of event packets where each carrier packet from the plurality of carrier packets includes a set of event packets including at least one redundant event packet. The set of event packets can be defined based on a sliding window applied to the stream of event packets.

The details of one or more implementations are set forth in the accompanying drawings and the description below. Other features will be apparent from the description and drawings, and from the claims.

DETAILED DESCRIPTION

Figure 1:
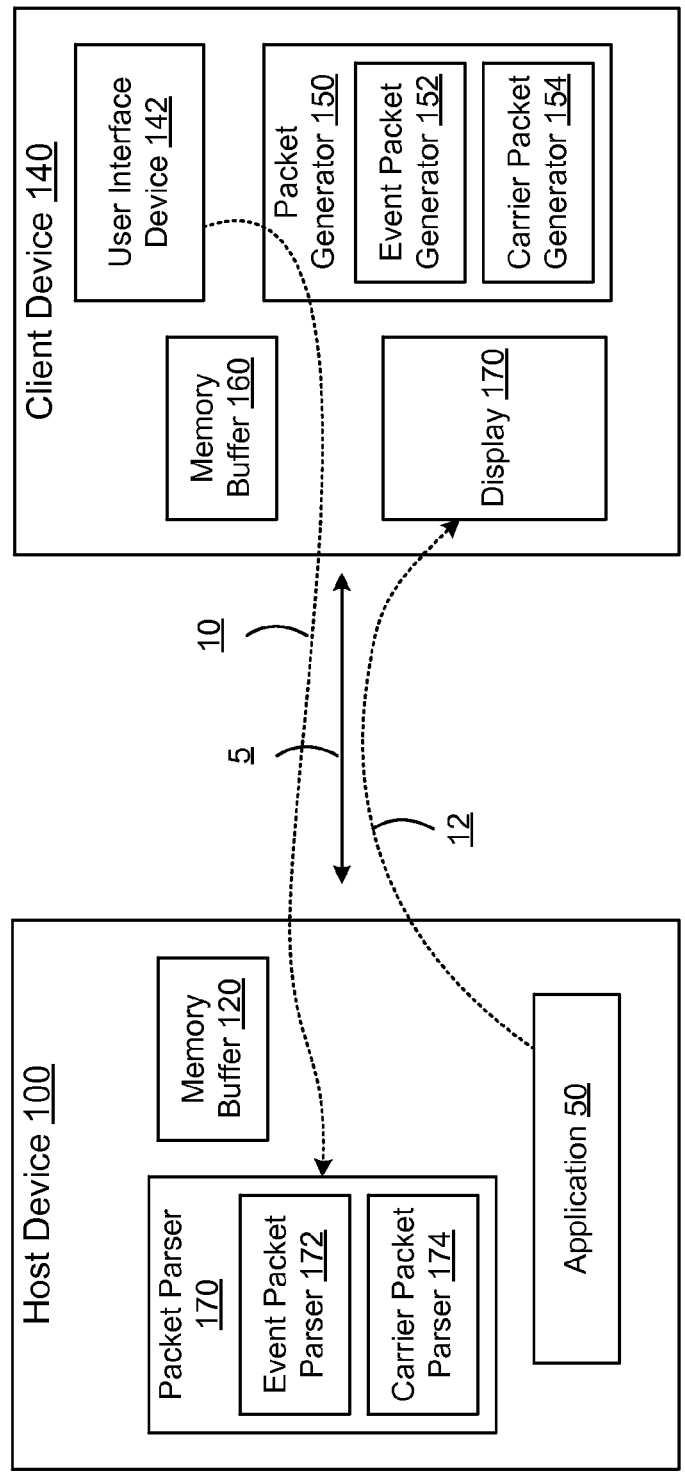
FIG. 1 is a diagram that illustrates a host device configured to communicate with a client device via a communication link.

FIG. 1 is a diagram that illustrates a host device 100 configured to communicate with a client device 140 via a communication link 5 (also can be referred to as a communication session or channel). The client device 140, in this embodiment, is configured to operate as a client (e.g., a thin client) of the host device 100 via, for example, a remote desktop session. The client device 140 can be used to interact with an application 50 operating at the host device 100 via the communication link 5, and the host device 100 can be configured to send to the client device 140 a stream of images (e.g., screen scrapes, screenshots) (also can be referred to as a stream of frames) representing responses to interactions with the application 50 during a remote desktop session. Accordingly, the processing resources of the host device 100 can be used by the client device 140 to operate the application 50 via the communication link 5 during the remote desktop session.

In other words, the stream of images can be screenshots that are updated as the client device 140 is used to interact with the application 50 operating at the host device 100. In some embodiments, the communication link 5 can be, for example, a wireless communication link, a wired communication link, a network communication link, and/or so forth. As used herein, the term "remote desktop session" can include any technologies and/or protocols in which commands (e.g., input values) issued from a local client are used to control the functionality (e.g., operation) of a host device (e.g., host device 100) including, for example, Windows Remote Desktop™, Citrix™, WebEx™, etc. technologies and/or protocols.

For example, a user interface (not shown) associated with the application 50 can be generated at the host device 100 operating the application 50. Input values (also can be referred to as event values) produced by a user interface device 142 of the client device 140, such as a mouse device, a keyboard device, a touchpad device, and/or so forth, can be used by a user to interact with the user interface of the application 50 via the communication link 5 during a remote desktop session. Images of the user interface, and interactions with the user interface (which can result in changes to the user interface), can be streamed, via the communication link 5, to the client device 140 where they can be displayed on the display 150. In some embodiments, the stream of images can, for example, define, or can be used to define, images in a video stream to the client device 140. In some embodiments, stream of images from the application 50 can be communicated to a display 170 of the client device 140 via path 12 represented as a dashed arrow within FIG. 1.

The input values can be sent multiple times (e.g., along path 10) from the client device 140 to the host device 100 for redundancy purposes because the communication link 5 can be a relatively unreliable communication link. The communication link 5 can be a link (e.g., a link based on a protocol) without delivery confirmation (e.g., handshaking), ordering, etc. that can be included in, for example, a transmission control protocol (TCP) link. Input values can be sent multiple times from the client device 140 to the host device 100 for redundancy purposes because an input value, when sent the first time, can be lost over the communication link 5 between the client device 140 and the host device 100. Because the communication link 5 can be a relatively unreliable communication link, the input value can be lost, or can become corrupted, due to noise, or another disruption, on the communication link 5. The input value (e.g., a copy of the input value), when sent a second time or a third time, can be received and processed by (e.g., registered by) the host device 100. Thus, by redundantly sending the input values (e.g., sending copies or duplicates of the input values) from the client device 140 to the host device 100, input values may be reliably received by the host device 100, with relatively small delay (e.g., a delay that is imperceptible to a user), and not entirely lost.

In some embodiments, the input values produced by the user interface device 142 can be, for example, indicators (e.g., electrical indicators) of a key stroke of a particular key of a keyboard (e.g., the letter "G", the letter "K"). In some embodiments, the input values can include one or more indicators of movement (e.g., acceleration, x-y movements) of a mouse device. In some embodiments, one or more input values produced by the user interface device 142 can be, for example, an instructions generated by the user interface device 142.

In some embodiments, one or more input values can be encoded within one or more event packets (also can be referred to as input packets) by an event packet generator 152 included in a packet generator 150 of the client device 140. In some embodiments, one or more input values can be encoded within one or more event packets by the event packet generator 152 as, for example, numbers, a binary string, an American Standard Code for Information Interchange (ASCII) character code, a hexadecimal string, and/or so forth. In some embodiments, each event packet can include an input value of a single action (e.g., event) triggered by a user such as a single keystroke of a keyboard device or a single mouse device movement. Thus, each event packet (and input value) can represent a single operation triggered at the user interface device.

In some embodiments, an event packet can include a header, a trailer, and an input value encoded within the event packet as a payload. In some embodiments, the header can include a sequence identifier representing a sequence of the event packet (and input value) with respect to other event packets (and input values), information (date/time stamp) representing a time that the event packet and/or input value is generated, length (e.g., byte or bit length) information, protocol identification information, and/or so forth. The trailer can include, for example, a cyclic redundancy check (CRC) code, packet start and/or end markers, and/or so forth.

In some embodiments, the sequence identifier can be reset (e.g., restarted) at the beginning of a remote desktop session. Accordingly, in some embodiments, the sequence identifier can be unique within a remote desktop session. In some embodiments, the sequence identifier can be a universally unique identifier (UUID) or a globally unique identifier (GUID). The sequence identifier can be incremented and included in each event packet as the event packets are generated based on input values.

The event packets including input values produced by the user interface device 142 can be communicated via the communication link 5 from the client device 140 to the host device 100 in one or more carrier packets produced by a carrier packet generator 154 included in the packet generator 150 of the client device 140. For example, several event packets produced by the event packet generator 152 can be stored in a memory buffer 160 of the client device 140. The several event packets (e.g., 3 event packets, 10 event packets, 100 event packets) stored in the memory buffer 160 can be included in a carrier packet produced by the carrier packet generator 154 and sent within the carrier packet via the communication link 5 to the host device 100. In some embodiments, the event packets can be stored in a payload of the carrier packet.

A single event packet (including one or more input values) can be sent multiple times for redundancy purposes in multiple carrier packets. For example, a single event packet (or copies or duplicates thereof) can be sent in a first carrier packet from the client device 140 to the host device 100. The single event packet can later be sent (e.g., sent in a redundant fashion) in a second carrier packet from the client device 140 to the host device 100.

In some embodiments, a single event packet (including one or more input values) that is sent multiple times for redundancy purposes in multiple carrier packets can be sent with other event packets. For example, a first set of event packets, including an event packet, can be sent in a first carrier packet from the client device 140 to the host device 100. A second set of event packets, including the event packet, can later be sent in a second carrier packet from the client device 140 to the host device 100. In some embodiments, the first set of event packets can overlap with (e.g., can be duplicates of) the second set of event packets.

In some embodiments, the event packets can be sent in a sliding queue (e.g., in a queue within a sliding window). For example, the last ten event packets, which each include one or more input values, can be buffered in the memory buffer 160 (or portion thereof) and can be sent in a carrier packet from the client device 140 to the host device 100. Each time a new event packet is produced, the oldest event packet stored in the memory buffer 160 can be shifted out of the memory buffer 160. The newly formed set of ten event packets stored in the memory buffer 160 (or allocated within the memory buffer 160 for sending), without the oldest event packet shifted out and including the new event packet, can be packaged into a carrier packet and sent to the host device 100. Accordingly, the memory buffer 160 can function as a first-in first-out (FIFO) buffer configured to store event packets from which carrier packets can be produced and sent to the host device 100.

As shown in FIG. 1, the host device 100 includes a packet parser 170 configured to process carrier packets, and the event packets included therein. Specifically, the packet parser 170 includes a carrier packet parser 174 configured to receive a carrier packet and extract the event packets included therein. An event packet parser 172 of the packet parser 170 is configured to process (e.g., register) event packets (and/or input values) that are included in the carrier packet. In some embodiments, the event packet parser 172 and/or the carrier packet parser 174 can be configured to request resending of one or more carrier packets and/or one or more event packets on an as needed basis as will be discussed below in more detail.

The event packets that are received within (e.g., extracted from) a carrier packet can be stored in a memory buffer 120 of the host device 100. As subsequent event packets are received in subsequent carrier packets by the packet parser 170, the subsequent event packets can be compared (by the event packet parser 172) with events packets already stored in the memory buffer 120 to identify duplicates and/or gaps. In other words, the duplicate event packets can be identified by the event packet parser 172 by comparing event packets (or portion thereof (e.g., sequence identifier, date/time stamp, payload)) received (in a carrier packet) at the event packet parser 172 with each event packet (or portion thereof (e.g., sequence identifier, date/time stamp, payload)) stored at the host device 100 (e.g., the memory buffer 120 of the host device 100). Event packets can include information such as sequence identifiers and/or date/time stamps (e.g., create date and time of an input value and/or an event packet) that can be used, by the event packet parser 172, to identify duplicate (e.g., redundant) events packets and/or gaps in a sequence of event packets.

For example, a first set of event packets, which each include input values, in a first carrier packet can be received at the host device 100 from the client device 140. The input values can be produced by the user interface device 142 when used to drag a user interface of a word processing application (i.e., application 50) operating at the host device 100 and controlled at the host device 100 using the client device 140 during a remote desktop session. A stream of images (or images) of the movement of the user interface can be produced at the host device 100 using the word processing application and sent to the client device 140 for display on the display 170. The first set of event packets can be stored in the memory buffer 120, and can have sequence identifiers 92 through 94 and 96 through 98 (for a total of 6 event packets). A second set of event packets, which each include input values, in a second carrier packet can be received at the host device 100 from the client device 140. The second set of event packets can have sequence identifiers 93 through 98 (for a total of 6 event packets). In this embodiment, consecutively numbered event packets can represent event packets that include input values consecutively produced in the order of the sequence identifiers at the user interface device 142, and the event packets can be identified by their sequence numbers (which are incrementally assigned). In some embodiments, an event packet with sequence identifier 93 can be referred to as event packet 93. The sequence identifiers from the second set of event packets can be compared with sequence identifiers from the first set of event packets to determine that event packets numbered 93 through 94 and 96 through 98 from the second set of event packets are duplicates of the event packets from the first set of event packets. The duplicate event packets from the second set of event packets can be discarded (by the event packet parser 172), or can replace (by the event packet parser 172) previously stored (and duplicate) event packets included in the first set of event packets. Also, the event packet 95 in the second set of event packets can be identified (by the event packet parser 172) as an event packet missing from the first set of event packets based on the sequence identifiers. Accordingly, the event packet 95, which was previously missing from the memory buffer 120, can be stored in the memory buffer 120. In this embodiment, the second set of event packets includes a subset of the first set of event packets.

In some embodiments, input values can be sent via a dedicated channel different from a dedicated channel for screen updates. For example, input values produced at the user interface device 142 and sent from the client device 140 to the host device 100 (via path 10) in carrier packets can be sent on an input channel separate from a screen update channel (via path 12) through which screen updates are sent from the host device 100 to the client device 140.

The host device 100 and/or the client device 140 can be, for example, a wired device and/or a wireless device (e.g., wi-fi enabled device) and can be, for example, a computing entity (e.g., a personal computing device), a mobile phone, a personal digital assistant (PDA), a server device (e.g., a web server), and/or so forth. The host device 100 and/or the client device 140 can be configured to operate based on one or more platforms (e.g., one or more similar or different platforms) that can include one or more types of hardware, software, firmware, operating systems, runtime libraries, and/or so forth. In some implementations, the host device 100 and/or the client device 140 can represent a cluster of devices (e.g., a server farm). In such an implementation, the functionality and processing of the host device 100 and/or the client device 140 can be distributed to several devices of the cluster of devices.

Although not shown in FIG. 1, the packet generator 150 (or portions thereof) and/or the memory buffer 160 (or portions thereof) can be configured to function (e.g., operate) separately from the client device 140 on another device (not shown). Also, although not shown in FIG. 1, the packet parser 170 (or portions thereof) and/or the memory buffer 120 (or portions thereof) can be configured to function (e.g., operate) separately from the host device 100 on another device (not shown).

The packet generator 150 and/or the packet parser 170 can be, or can include, various types of hardware and/or software. In some implementations, one or more portions of the components shown in the packet generator 150 and/or the packet parser 170 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the packet generator 150 and/or the packet parser 170 can be, or can include, a software module configured for execution by at least one processor (not shown). In some implementations, the functionality of the components can be included in different modules and/or components than those shown in FIG. 1. For example, although not shown, the functionality of the packet generator 150 can be divided into several different modules.

Although not shown, in some implementations the packet generator 150 (or portions thereof) and/or the packet parser 170 (or portions thereof) can be configured to operate within, for example, a data center (e.g., a cloud computing environment), a computer system, one or more server/host devices, and/or so forth. In some implementations, the packet generator 150 (or portions thereof) and/or the packet parser 170 (or portions thereof) can be configured to operate within a network. Thus, the packet generator 150 (or portions thereof) and/or the packet parser 170 (or portions thereof) can be configured to function within various types of network environments that can include one or more client devices (such as client device 140) and/or one or more host devices (such as host device 100). For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Although not shown, in some implementations, the memory buffer 120 and/or the memory buffer 160 can be implemented as more than one memory component (e.g., more than one random-access memory (RAM) component or disk drive memory). In some implementations, the memory buffer 120 and/or the memory buffer 160 can be a database memory. In some implementations, the memory buffer 120 and/or the memory buffer 160 can be, or can include, a non-local memory. For example, the memory buffer 120 and/or the memory buffer 160 can be, or can include, a memory shared by multiple devices (not shown). In some implementations, the memory buffer 120 and/or the memory buffer 160 can be associated with a server device (not shown) within a network and configured to serve the host device 100 and/or the client device 140.

Figure 2:
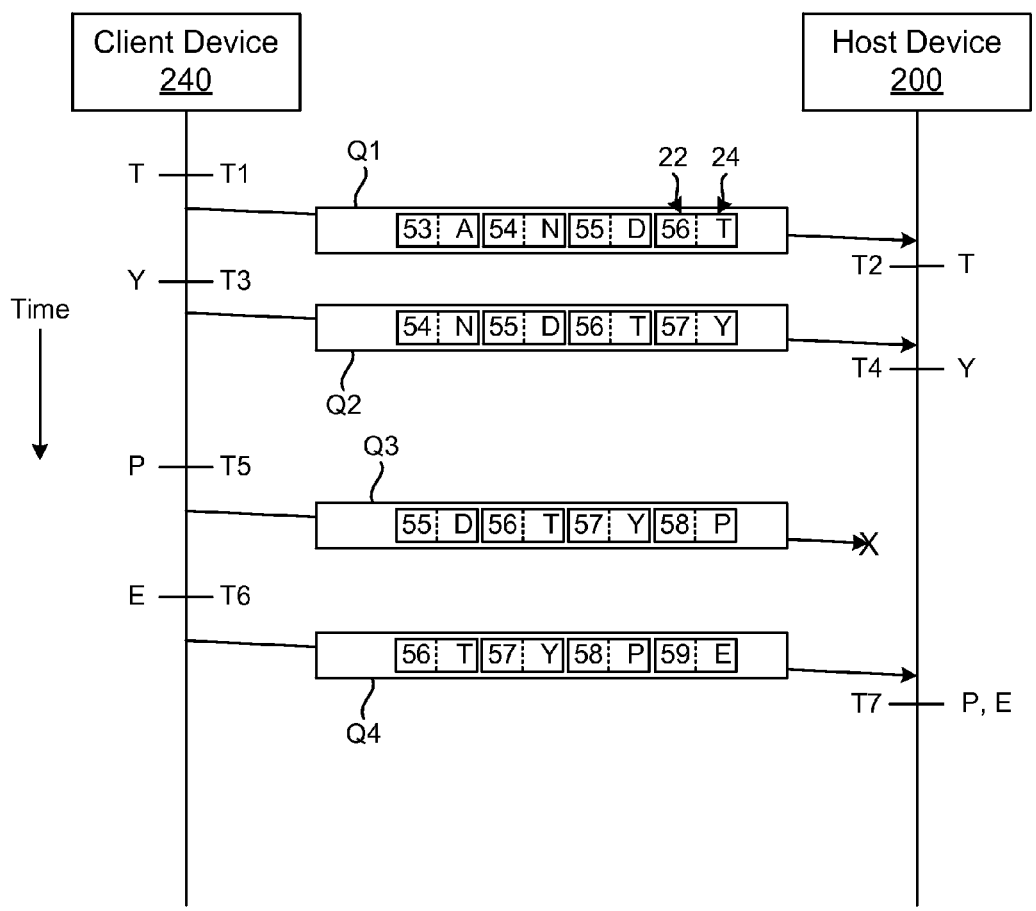
FIG. 2 is a timing diagram that illustrates sending of carrier packets from a client device to a host device.

FIG. 2 is a timing diagram that illustrates sending of carrier packets from a client device 240 to a host device 200. In this embodiment, time is increasing in a downward direction.

The carrier packets, which are shown as carrier packets Q1 through Q4, each include four event packets. Although only one of the event packets in this embodiment is labeled as an example, each of the event packets has a portion 22 that includes a sequence identifier represented by one of numbers 53 through 59, and a portion 24 that includes an encoded keystroke from a keyboard device represented by letters from the alphabet. In some embodiments, the event packets can be referred to by their sequence identifiers and/or by the letter included therein. For example, if the letter X is encoded in an event packet with sequence identifier 199, the event packet can be referred to as event packet X and/or as event packet 199. In some embodiments, each of the carrier packets Q1 through Q4 can be configured to include (e.g., contain) more than four (e.g., 10, 15, 20, 50, 100) event packets or less than four (e.g., 2) event packets.

As shown in FIG. 2, the letters T, Y, P, and E (which can be referred to as input values) associated with the client device 240 (along the left side of the figure) at times T1, T3, T5 and T6, respectively, indicate keystrokes triggered at a keyboard device of the client device 240. The letters T, Y, P, and E associated with the host device 200 (along the right side of the figure) at various times (e.g., times T2, T3, and T7) indicate processing (e.g., registering) of the keystrokes at the host device 200.

As shown at time T1 in FIG. 2, a letter T is triggered at the client device 240. The letter T is encoded within an event packet with sequence identifier 56 in the carrier packet Q1 along with other event packets with previously encoded keystrokes A, N, and D. At time T2, the letter T is processed (e.g., registered) from the carrier packet Q1 at the host device 200. The event packets included in the carrier packet Q1 (and the other carrier packets Q2 through Q4) can be retrieved from storage within a memory buffer (e.g., a queue of a memory buffer) of the client device 240.

At time T3 in FIG. 2, a letter Y is triggered at the client device 240. The letter Y is encoded within an event packet with sequence identifier 57 in the carrier packet Q2 along with other event packets with previously encoded keystrokes N, D, and T. The event packet including the letter A (and sequence identifier 53) is not included in the carrier packet Q2 because this event packet has been shifted out of queue for sending within a carrier packet with the addition of the event packet including the letter Y (and sequence identifier 57).

At time T4, the letter Y is processed (e.g., registered) from the carrier packet Q2 at the host device 200. Although the event packet associated with the letter T is also included (for redundancy) in the carrier packet Q2, the letter T is not re-processed at the host device 200 because the letter T was previously processed (e.g., registered) at the host device 200 at time T2. The letter T can be identified as having been previously processed because the sequence identifier of 56 and the event packet for the letter T included in the carrier packet Q1 is the same as that for the letter T included in the carrier packet Q2. The event packet associated with the letter T that is included in the carrier packet Q2 can be discarded because the event packet is a duplicate.

At time T5 in FIG. 2, a letter P is triggered at the client device 240, and the letter P is encoded within an event packet with sequence identifier 58 in the carrier packet Q3 along with other event packets with previously encoded keystrokes D, T, and Y. The event packet including the letter N (and sequence identifier 54) is not included in the carrier packet Q3 because this event packet has been shifted out of queue for sending within a carrier packet with the addition of the event packet including the letter P (and sequence identifier 58). As illustrated in FIG. 2, the carrier packet Q3 does not reach the host device 200 because the packet is, for example, lost along a communication link (e.g., communication link 5 in FIG. 1). Because the carrier packet Q3 is lost, the letter P cannot be processed (e.g., registered) from the carrier packet Q3.

At time T6 in FIG. 2, a letter E is triggered at the client device 240, and the letter E is encoded within an event packet with sequence identifier 58 in the carrier packet Q4. The event packet associated with the letter E is also included with the previously encoded keystrokes T, Y, and P. The event packet including the letter D (and sequence identifier 55) is not included in the carrier packet Q4 because this event packet has been shifted out of queue for sending within a carrier packet with the addition of the event packet including the letter E (and sequence identifier 59). The event packet associated with the letter P is also included in the carrier packet Q4 at the client device 240 for redundancy with the carrier packet Q3. Both of the letters P and E are processed (e.g., registered) at the host device 200 (for the first time) because the event packets including the letters P and E were not previously received and processed (e.g., registered). The event packet associated with the letter P was previously sent, but was not processed (e.g., registered) because the carrier packet Q3 did not reach the host device 200. In this example, the redundant event packet associated with the letter P is received at the host device 200.

Because the event packet P is sent redundantly in multiple carrier packets, the event packet P is received at the host device 200 without the host device 200 requesting that the event packet P be resent. Although the event packet P, which includes sequence identifier 58, could be identified as missing when the event packet E, which includes a later sequence identifier of 59, is received, the event packet P is already received and requesting the missing event packet is unnecessary.

Although not shown in FIG. 2, if relatively large numbers of event packets are lost, the lost event packets can be requested by the host device 200 (e.g., requested by an event packet parser) from the client device 240. For example, if multiple carrier packets are lost so that event packets (including redundant event packets) are not received (in any carrier packets before or after the multiple carrier packets) at the host device 200 for one or more input values, sequence identifiers included in the event packets can be used to identify which event packets are missing. The missing event packets can be requested (e.g., requested using sequence identifier) by the host device 200 from the client device 240. In some embodiments, the client device 240 (e.g., a memory buffer of the client device 240) can be configured to store a relatively large number of event packets (e.g., more event packets than can be included in a carrier packet) so that event packets can be resent to the host device 200 in the event that several consecutive carrier packets are lost so that redundant event packets are not received.

In this embodiment, the number of event packets included in each of the carrier packets Q1 through Q4 is the same. Specifically, the number of event packets included in each of the carrier packets Q1 through Q4 is four. Accordingly, each of the event packets is redundantly sent from the client device 240 to the host device 200 four times. In this embodiment, the event packets are redundantly sent from the client device 240 to the host device 200 the same number of times as the number of event packets included in each of the carrier packets.

In some embodiments, carrier packets (e.g., consecutive carrier packets) can include different numbers of event packets. In some embodiments, the number of event packets included in a carrier packet can depend on the number of input values being created at the client device 240. For example, if only one input value is triggered within a threshold period of time, a single event packet including the input value can be included in a carrier packet even though the carrier packet has a capacity to contain more than one event packet.

In some embodiments, the number of event packets included in the carrier packet can depend on a capacity of the carrier packet. For example, a carrier packet may have a limited number of bytes and/or slots (within a payload) within which event packets can be included. Accordingly, a number of event packets included in the carrier packet can be limited by a number of bytes available in the carrier packet for transporting event packets from the client device 240 to the host device 200. In some embodiments, event packets included within the carrier packet can have a variable length or a fixed length. The event packets can have a length (e.g., a bitwise length) that is significantly shorter (e.g., five times shorter, ten times shorter) than a length (e.g., a bitwise length) of the carrier packet.

In some embodiments, during periods (e.g., inactive periods) when input values are not being triggered by a user and event packets are not being generated at the client device 240, one or more carrier packets including previously generated and/or stored event packets can be periodically, randomly, and/or so forth, sent from the client device 240 to the host device 200. For example, the last five event packets generated and stored at the client device 240 can be sent (e.g., repeatedly sent) from the client device 240 to the host device 200 every few seconds (or during randomly determined time intervals) even though new event packets are not being generated at the client device 240 in response to triggered input values. The event packets, because they may be redundant, can be dropped at the host device 200 when received at the host device 200.

In some embodiments, carrier packets can be produced and sent from the client device 240 to the host device 200 in response to input values being triggered. As shown in FIG. 2, the carrier packets Q1 through Q4 are produced and sent in response to the keystrokes being triggered. For example, the carrier packet Q1 is generated and sent in response to the keystroke T being triggered at time T1. In some embodiments, carrier packets can be generated (e.g., created) after a delay (e.g., a predefined delay) from an input value being triggered.

In some embodiments, a carrier packet can be generated after multiple input values have been triggered. The threshold number of input values triggering generation (e.g., production) of a carrier packet can be smaller than the number of event packets (associated with input values) that can be included in the carrier packet. For example, carrier packets that include more than two event packets (each of which is associated with an input value) can be generated in response to every two event packets being generated at the client device 240.

Figure 3:
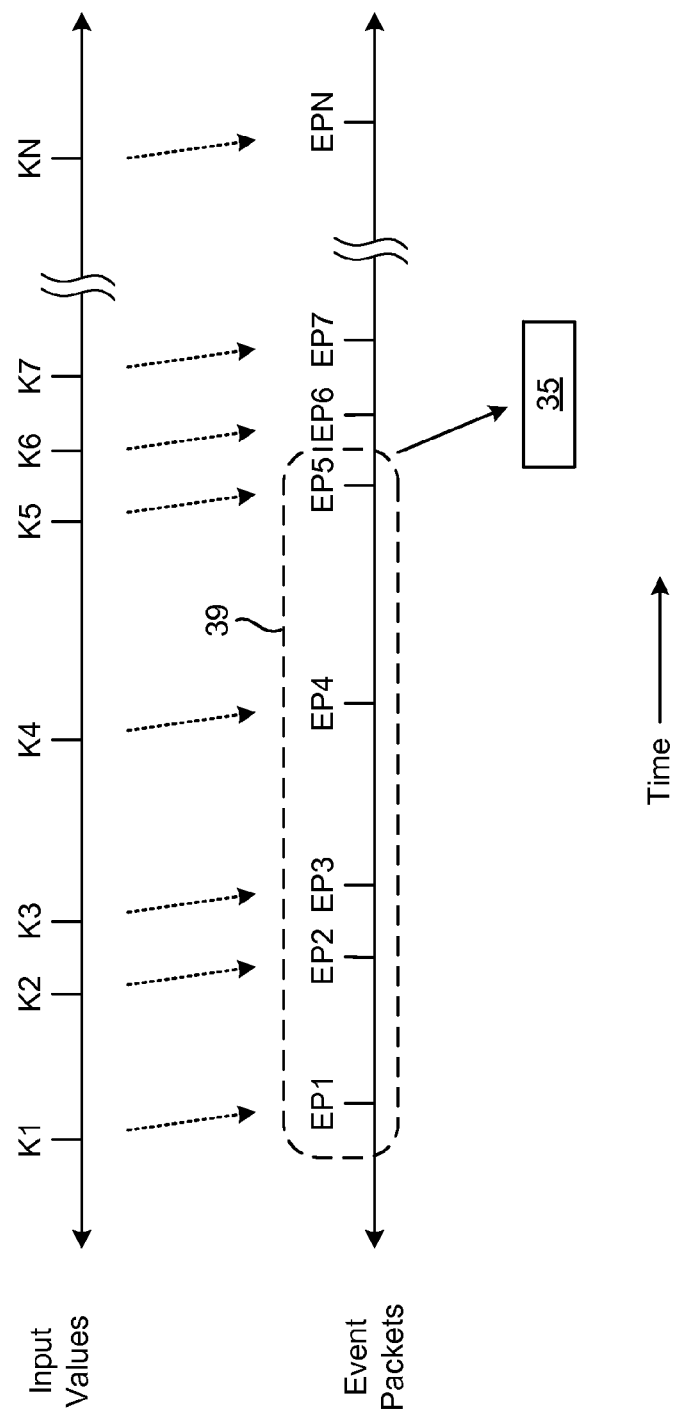
FIG. 3 is a diagram that illustrates a sliding window that can be used for generating a carrier packet.

FIG. 3 is a diagram that illustrates a sliding window 39 that can be used for generating (e.g., producing) a carrier packet 35. As shown in FIG. 3, time is increasing to the right. As shown in FIG. 3, input values K1 through KN are triggered and corresponding event packet EP1 through EPN are generated at various times at a client device (not shown). The input values can be referred to as a stream of input values, and event packets generated based on the stream of input values can be referred to as a stream of event packets.

In this embodiment, the carrier packet 35 is generated based on event packets EP1 through EP5, which can include input values K1 through K5, within the sliding window 39. Although not shown, in response to the input value EP6 being generated (based on input value K6), the sliding window 39 can be shifted to the right so that an additional carrier packet (not shown) can be generated based on event packets EP2 through EP6, which correspond with input values K2 through K6. Accordingly, the additional carrier packet can include at least one event packet (several in this case) redundant with the event packets included in carrier packet 35. As illustrated by this embodiment, the sliding window 39 can be applied to the stream of event packets to define the carrier packet 35 and subsequent carrier packets.

In this embodiment, the size of the sliding window 39 is statically set at a specified number of event packets (or input values). Specifically, the size of the sliding window 39 shown in FIG. 3 is the last five input values.

In some embodiments, the size of the sliding window 39 can be based on a time window rather than a number of input values. For example, the sliding window 39 can be configured to trigger generation of a carrier packet based on event packets (or input values) falling within a specified time frame. In such embodiments, the number of input values included in the carrier packet can vary based on the number of input values falling within the specified time frame. In some embodiments, the number of input values can be limited by a capacity (e.g., a predefined size, a maximum capacity) of the carrier packet.

Figure 4:
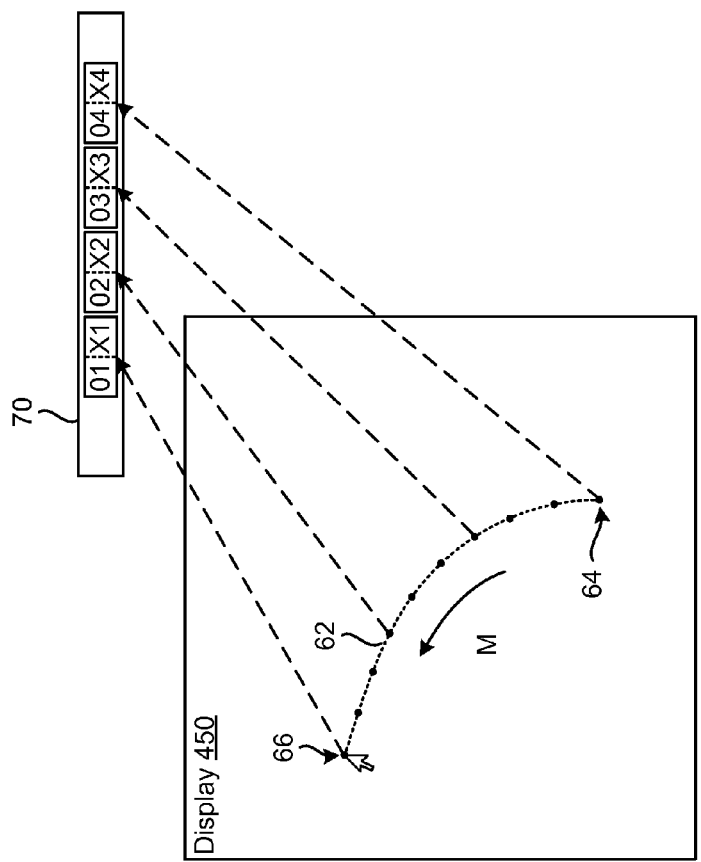
FIG. 4 is a diagram that illustrates a mouse movement within a display of a client device compressed into event packets of a carrier packet.

FIG. 4 is a diagram that illustrates a mouse movement within a display 450 of a client device compressed into event packets of a carrier packet 70. The mouse movement is represented by a dashed line 62 and can be referred to as mouse movement 62. As shown in FIG. 4, the mouse movement 62 is produced along the direction M and can be characterized by a series of x-y input values represented by dots along the dashed line 62. The mouse movement 62 can be produced by a user using a user interface device (e.g., user interface device 142 shown in FIG. 1) such as a mouse device or a trackpad device of a client device (e.g., client device 140 shown in FIG. 1) during a remote desktop session. The input values can be produced as the mouse movement 62 is performed by the user using the user interface device of the client device and sent to a host device (e.g., host device 100 shown in FIG. 1) in carrier packets (encoded within event packets). The input values can be used to generate screen updates of the mouse movement that can be sent to the client device and displayed on the display 450 of the client device.

Although each of the input values can be represented within (e.g., encoded within) an event packet, only a few event packets associated with the mouse movement 62 are defined and included in a carrier packet 70 (at a client device). Specifically, four of the input values (represented by dashed arrow between the mouse movement 62 and the carrier packet 70) are encoded in event packets with sequence identifiers 01 through 04 and values X1 through X4, respectively. In other words, only a subset of the input values that are representative of, or approximate, the mouse movement 62 are encoded within event packets of the carrier packet 70. In some embodiments, the input values can represent, for example, x-y coordinates, direction, etc. of the mouse movement 62. Because less than all of the input values along the mouse movement 62 are encoded within event packets of the carrier packet 70, the mouse movement 62 can be referred to as being compressed or as being approximated.

Less than all of the input values along the mouse movement 62 can be encoded within event packets of the carrier packet 70 so that the number of event packets redundantly sent from a client device (e.g., client device 140 shown in FIG. 1) to a host device (e.g., host device 100 shown in FIG. 1) during, for example, a remote desktop session can be reduced. For example, because the mouse movement 62 can be represented by numerous event packets (and input values), the total number of carrier packets needed to communicate the mouse movement 62 from a client device to a host device can be relatively high if each event packet associated with the mouse movement 62 is sent multiple times (as duplicates). In some embodiments, the duplicative sending of the numerous event packets associated with the mouse movement 62 can result in communication of the mouse movement 62 to the host device being delayed (e.g., delayed in a fashion perceptible to a user). Consequently, screen updates of the mouse movement 62 communicated from the host device to the client device will also be delayed. The total number of carrier packets needed to communicate the mouse movement 62 from the client device to the host device (and potential communication delay) can be reduced if the mouse movement 62 is approximated (or compressed) using a subset of event packets. Because each input value of the mouse movement 62 may not be needed to communicate the mouse movement 62 in a desirable fashion, the mouse movement 62 may be approximated (or compressed) without a perceptible degradation in quality of visual representation of the mouse movement 62 in screen updates sent to the client device for consumption by a user.

In some embodiments (and as shown in FIG. 4), at least a beginning input value 64 and an end input value 66 that are included in the mouse movement 62 are included in the carrier packet 70. Also, in this embodiment, a few input values (also can be referred to as intermediate input values) between the beginning input value 64 and the end input value 66 are included in the carrier packet 70. In some embodiments, the intermediate input values may not be evenly spaced (from one another) between a beginning input value and an end input value. In some embodiments, only input values representing inflections between mouse movements can be encoded into event packets and sent within a carrier packet from a client device.

In some embodiments, interactions using other types of user interface device such as a joystick, game controller, etc. may be approximated or compressed. For example, other movements of a mouse device (or other type of user interface device such as a joystick, game controller, etc.) such as scrolling movements of a scroll wheel of a mouse device and/or trackpad device may be approximated or compressed. In some embodiments, interactions of a user interface device that are characterized as critical may not be approximated. For example, clicking movements of a mouse device and/or trackpad device can be characterized as critical and may not be approximated or compressed before being encoded into event packets and sent via a carrier packet from a client device. Similarly, beginning input values and/or end endpoint values of a mouse device and/or trackpad device can be characterized as critical and may not be approximated or compressed before being encoded into event packets and sent via a carrier packet from a client device.

In some embodiments, event packets associated with a particular type of interaction and/or user interface device (e.g., mouse device, keyboard device) may not be redundantly sent within multiple carrier packets. In some embodiments, only event packets identified as critical (e.g., critical interactions, including critical input values) may be redundantly sent within multiple carrier packets. It follows that event packets identified as non-critical (e.g., non-critical interactions, including non-critical input values) may not be redundantly sent within multiple carrier packets. For example, input values associated with mouse movements (e.g., mouse movements not identified as critical mouse movements) may not be redundantly sent using multiple carrier packets from the client device to the host device. In such embodiments, input values triggered in response to keystrokes using a keyboard device may be redundantly sent (after being identified as critical) from the client device to the host device using carrier packets. In such embodiments, input values associated with the mouse movements may be included in carrier packets separate from input values associated with the keystrokes.

Figure 5:
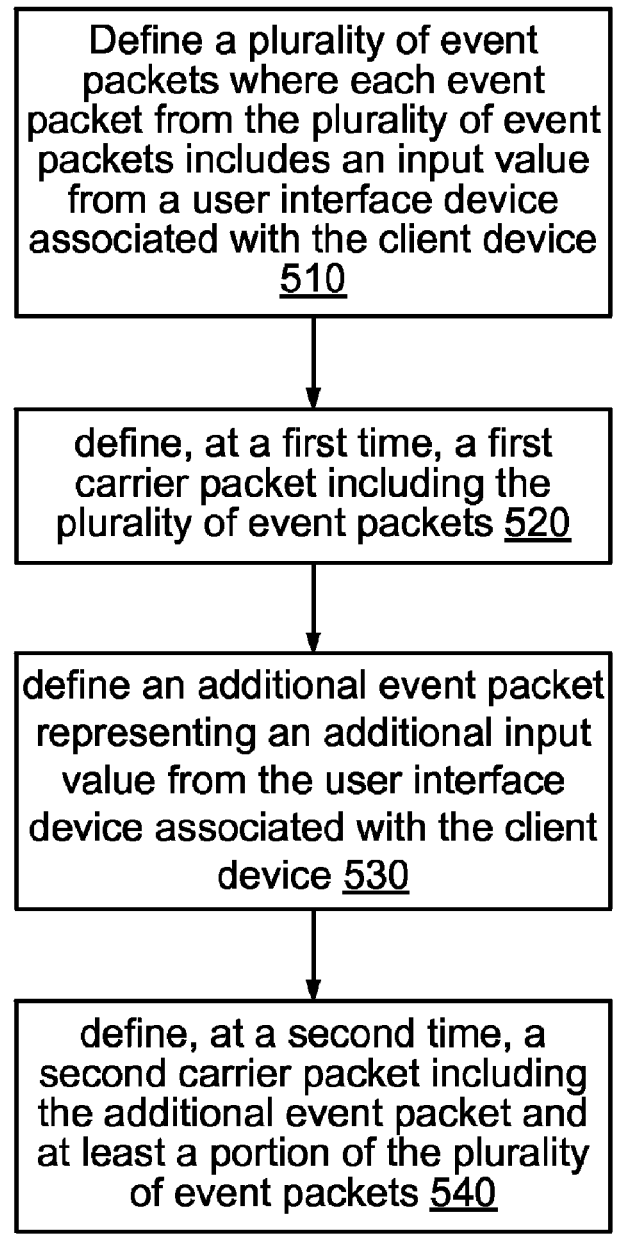
FIG. 5 is a flowchart illustrating a method for defining a carrier packet based on event packets.

FIG. 5 is a flowchart illustrating a method for defining a carrier packet based on event packets. At least some portions of the method can be performed by a client device (e.g., packet generator 150 of the client device 140 shown in FIG. 1).

As shown in FIG. 5, a plurality of event packets is defined where each event packet from the plurality of event packets includes an input value from a user interface device associated with the client device (block 510). The input values can be produced by a user interface device such as user interface device 142 shown in FIG. 1. For example, each of the input values can represent a keystroke on a keyboard device, or a portion of the movement of the mouse device. In some embodiments, each event packet can represent a single operation triggered at the user interface device. In some embodiments, each of the event packets can include a sequence identifier (e.g., an incrementally assigned sequence identifier), a date/time stamp, and/or so forth.

At a first time, a first carrier packet including the plurality of event packets is defined (block 520). The first carrier packet includes a footer (e.g., trailer), a header, and/or so forth can be sent from the client device to a host device via a communication link. In some embodiments, the communication link can be based on a protocol without delivery confirmation.

An additional event packet representing an additional input value from the user interface device associated with the client device can be defined (block 530). The additional input value can be triggered by a user using the user interface device after the input values associated with the plurality of event packets have been triggered.

At a second time, a second carrier packet including the additional event packet and at least a portion of the plurality of event packets is defined (block 540). Accordingly, the first carrier packet can include at least a portion of (e.g., all of, a subset of) the event packets that are duplicated within the second carrier packet. In some embodiments, the additional event packet, although it is in the second carrier packet, may not be duplicated within first carrier packet.

Figure 6:
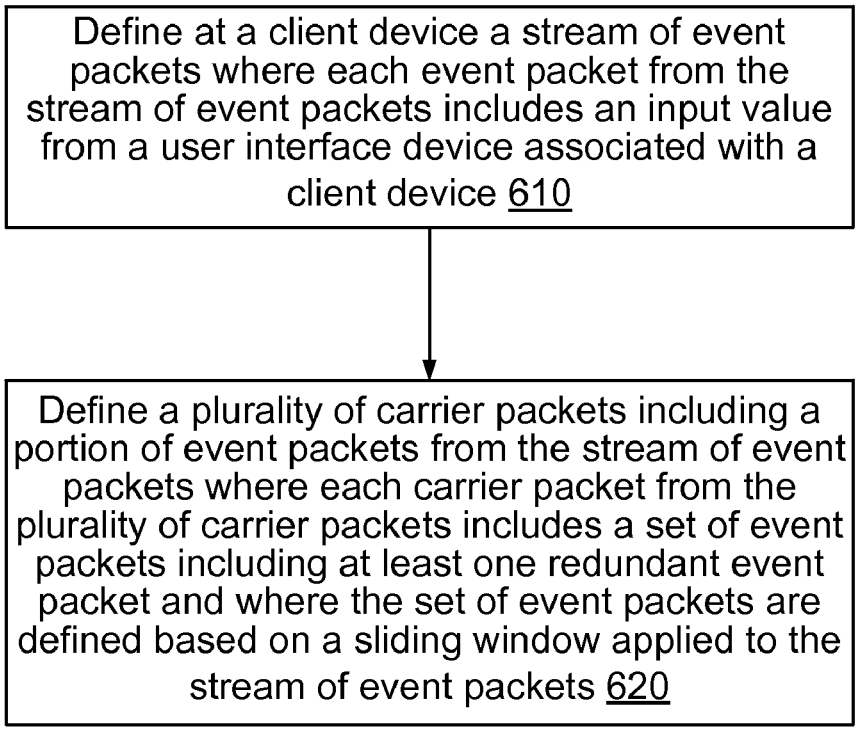
FIG. 6 is a flowchart illustrating another method for defining a carrier packet based on event packets.

FIG. 6 is a flowchart illustrating another method for defining a carrier packet based on event packets. At least some portions of the method can be performed by a client device (e.g., the packet generator 150 of the client device 140 shown in FIG. 1).

As shown in FIG. 6, a stream of event packets can be defined at a client device where each event packet from the stream of event packets includes an input value from a user interface device associated with a client device (block 610). The input values associated with the stream of event packets can be triggered by a user using the user interface device. For example, each of the input values can represent a keystroke on a keyboard device, or a portion of the movement of the mouse device.

A plurality of carrier packets including a portion of event packets from the stream of event packets is defined where each carrier packet from the plurality of carrier packets includes a set of event packets including at least one redundant event packet and where the set of event packets are defined based on a sliding window applied to the stream of event packets (block 620). In some embodiments, all but one event packet from each of the carrier packets can be a duplicate or a redundant event packet. In some embodiments, the sliding window can be based on a fixed number of event packets (e.g., 5 event packets, 10 event packets), or can be based on a fixed period of time (e.g., 10 milliseconds (ms), 30 ms, 1 second)

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a light emitting diode (LED) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium storing instructions that when executed cause a client device to perform a process, the instructions comprising instructions to:
  access at least a portion of a remote desktop session between the client device and a host device operating an application controlled at the client device;
  produce a plurality of event packets, each event packet from the plurality of event packets including an input value from a user interface device associated with the client device;
  send, at a first time, a first carrier packet including the plurality of event packets via the remote desktop session, the plurality of event packets being selected for inclusion in the first carrier packet based on a sliding window;
  produce an additional event packet representing an additional input value from the user interface device associated with the client device; and
  send, at a second time, a second carrier packet including the additional event packet and at least a portion of the plurality of event packets via the remote desktop session, the portion of the plurality of event packets being duplicated from the first carrier packet, the second carrier packet including at least two event packets different from each event packet from the plurality of event packets.

2. The non-transitory computer-readable storage medium of claim 1, wherein each event packet from the plurality of event packets includes a unique sequence identifier representing an order that each event packet from the plurality of event packets is produced.

3. The non-transitory computer-readable storage medium of claim 1, wherein the plurality of event packets are ordered within a sequence, the additional event packet includes a sequence identifier representing an order within the sequence after the order of the plurality of event packets within the sequence.

4. The non-transitory computer-readable storage medium of claim 1, wherein the plurality of event packets is a first plurality of event packets, the additional event packet and the at least the portion of the first plurality of event packets define a second plurality of event packets, the first plurality of event packets includes a number of event packets equal to a number of event packets included in the second plurality of event packets.

5. The non-transitory computer-readable storage medium of claim 1, wherein the least the portion is a subset.

6. The non-transitory computer-readable storage medium of claim 1, wherein the user interface device is a keyboard, each event packet from the plurality of event packets is produced in response to a keystroke on the keyboard.

7. The non-transitory computer-readable storage medium of claim 1, wherein the user interface device is a mouse device, each event packet from the plurality of event packets is associated with an approximation of a mouse movement.

8. The non-transitory computer-readable storage medium of claim 1, further comprising instructions to:
  resend the second carrier packet to the host device after a threshold period of time has elapsed without an input value from the user interface device being produced after the second time.

9. The non-transitory computer-readable storage medium of claim 1, wherein the plurality of event packets includes at least three event packets.

10. The non-transitory computer-readable storage medium of claim 1, wherein the remote desktop session is based on a protocol excluding delivery confirmation.

11. The non-transitory computer-readable storage medium of claim 1, wherein an event packet from the plurality of event packets includes a sequence identifier,
  the instructions further comprising instructions to:
  increment the sequence identifier in response to the producing of the additional event packet; and
  associate the incremented sequence identifier with the additional event packet.

12. The non-transitory computer-readable storage medium of claim 1, wherein the additional event packet is included in the at least two event packets.

13. The non-transitory computer-readable storage medium of claim 1, wherein each event packet from the plurality of event packets includes a single input value.

14. An apparatus, comprising:
  a memory;
  a packet parser configured to receive, via a remote desktop session between a client device and a host device operating an application controlled at the client device, a first carrier packet including a first set of event packets, each event packet from the first set of event packets including an input value from a user interface device of the client device and being selected for inclusion in the first carrier packet based on a sliding window,
  the packet parser configured to receive, via a remote desktop session, a second carrier packet including a second set of event packets duplicating at least a portion of the first set of event packets included in the first carrier packet, the second carrier packet including a third set of event packets having at least two event packets different from each event packet included in the first set of event packets and the second set of event packets; and
  an event packet parser configured to identify an event packet from the third set of event packets, and configured to register an input value included in the event packet in response to the identification.

15. The apparatus of claim 14, wherein the event packet parser is configured to discard the second set of event packets in response to the identification.

16. The apparatus of claim 12, wherein the event packet is included in a third carrier packet.

17. The apparatus of claim 14, wherein each event packet from the first set of event packets includes a unique sequence identifier representing an order that the input value for each event packet from the first set of event packets is generated at the client device.

18. The apparatus of claim 14, further comprising:
  a memory buffer configured to store the first set of event packets, the event packet parser configured to compare each event packet from the set of second event packets with each event packet from the first set of event packets.

19. The apparatus of claim 14, wherein the event packet parser is configured to identify a gap in sequence of sequence identifiers associated with the second set of event packets, the packet parser is configured to request resending of an event packet in response to identification of the gap in the sequence.

20. A method, comprising:
- accessing at least a portion of a remote desktop session between a client device and a host device operating an application controlled at the client device;
- producing at the client device a stream of event packets, each event packet from the stream of event packets including an input value from a user interface device associated with the client device; and
- sending, to the host device via the remote desktop session, a plurality of carrier packets including a portion of event packets from the stream of event packets, a first carrier packet from the plurality of carrier packets including a first set of event packets including at least one event packet redundant with a second set of event packets from a second carrier packet from the plurality of carrier packets, the first set of event packets and the second set of event packets being selected based on a sliding window applied to the stream of event packets, the first carrier packet from the plurality of carrier packets including a third set of event packets having at least two event packets different from each event packet included in the first set of event packets and the second set of event packets.

21. The method of claim 20, wherein the plurality of carrier packets is a first plurality of carrier packets and the stream of event packets is a first stream of event packets associated with a first user interface device, the method further comprising:
- producing a second plurality of carrier packets including a second stream of event packets associated with a second user interface device and sent from the client device to the host device without redundant event packets from the second stream of event packets.

22. The method of claim 20, wherein the sliding window has a size based on a number of event packets.

23. The method of claim 20, wherein each carrier packet from the plurality of carrier packets includes an equal number of event packets, and each event packet is redundantly sent from the client device, the first set of event packets are included in a payload of the first carrier packet.

24. The method of claim 20, wherein the first carrier packet from the plurality of carrier packets includes a subset of event packets identical to a subset of event packets included in the second carrier packet from the plurality of carrier packets.

25. The method of claim 20, wherein the application operating at the client device is controlled via input values included in the stream of event packets.

26. The method of claim 20, wherein the user interface device is a keyboard device, each input value included in each event packet represents a single keystroke triggered via the keyboard device.

* * * * *

UNITED STATES PATENT AND TRADEMARK OFFICE
CERTIFICATE OF CORRECTION

PATENT NO.       : 8,230,009 B1                                Page 1 of 1
APPLICATION NO.  : 13/246200
DATED            : July 24, 2012
INVENTOR(S)      : Albert Wong et al.

It is certified that error appears in the above-identified patent and that said Letters Patent is hereby corrected as shown below:

In column 16, line 53, in claim 16, delete "12," and insert -- 14, --, therefor.

In column 15, line 59, in claim 5, before "least", insert -- at, --.

Signed and Sealed this
Twenty-third Day of October, 2012

David J. Kappos
*Director of the United States Patent and Trademark Office*